(12) United States Patent
Maresh et al.

(10) Patent No.: US 8,683,473 B2
(45) Date of Patent: Mar. 25, 2014

(54) DYNAMIC TASK ASSOCIATION BETWEEN INDEPENDENT, UNRELATED PROJECTS

(75) Inventors: Mark E. Maresh, Research Triangle Park, NC (US); Eric A. Stegner, Research Triangle Park, NC (US); Robert W. Stegner, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 13/117,868

(22) Filed: May 27, 2011

(65) Prior Publication Data

US 2012/0304187 A1 Nov. 29, 2012

(51) Int. Cl.
*G06F 9/46* (2006.01)

(52) U.S. Cl.
USPC .......................................................... 718/103

(58) Field of Classification Search
None
See application file for complete search history.

(56) References Cited

U.S. PATENT DOCUMENTS

| | | | |
|---|---|---|---|
| 6,779,182 B1* | 8/2004 | Zolnowsky | 718/103 |
| 7,747,966 B2 | 6/2010 | Leukart et al. | |
| 2004/0226013 A1* | 11/2004 | Mariotti et al. | 718/100 |
| 2004/0243422 A1 | 12/2004 | Weber et al. | |
| 2005/0278209 A1* | 12/2005 | Kayahara et al. | 705/8 |
| 2007/0033085 A1 | 2/2007 | Johnson | |
| 2007/0038498 A1 | 2/2007 | Powell et al. | |
| 2007/0282658 A1* | 12/2007 | Brintle | 705/9 |
| 2009/0132331 A1 | 5/2009 | Cartledge et al. | |
| 2009/0222481 A1* | 9/2009 | Fisher et al. | 707/104.1 |
| 2009/0282414 A1* | 11/2009 | Branda et al. | 718/103 |
| 2009/0299810 A1 | 12/2009 | Jardine et al. | |
| 2010/0115523 A1* | 5/2010 | Kuschel | 718/103 |
| 2010/0257015 A1 | 10/2010 | Molander | |
| 2010/0325582 A1* | 12/2010 | Bansal et al. | 715/810 |

OTHER PUBLICATIONS

Kucyi et al., Display a Personal Work Schedule in an Electronic Calendar, IP.com Technical Disclosure, Mar. 1992, IPCOM000107811D.

A method for scaling overall calendar availability in response to other scheduled events, IP.com Technical Disclosure, Jun. 17, 2010, IPCOM000196811D.

* cited by examiner

*Primary Examiner* — Gregory A Kessler
(74) *Attorney, Agent, or Firm* — Kunzler Law Group, PC

(57) ABSTRACT

An apparatus, system, and method are disclosed for dynamic task association. The method includes maintaining a plurality of projects. Each project may include a plurality of tasks specific to the project. The method may also include detecting a change in a particular task of a first project that affects one or more tasks of a second project. The first project and the second project may be of the plurality of projects and the second project may be independent from the first project. The method may also include updating one or more tasks of the second project affected by the change in response to detecting the change in the particular task of the first project.

20 Claims, 7 Drawing Sheets

DYNAMIC TASK ASSOCIATION BETWEEN INDEPENDENT, UNRELATED PROJECTS

FIELD

The subject matter disclosed herein relates to tasks and more particularly relates to dynamic task association.

BACKGROUND

A user typically uses calendar applications, project management applications, and/or task applications (e.g. "To-Do" list applications) to manage time, projects, and tasks. Due to the variable nature of projects and tasks, the user may have to frequently adjust project and task settings and/or correlate events from one application with those of another.

Furthermore, typical project management applications may adjust attributes for tasks within a particular project without considering other unrelated projects. In reality, the complexity of a project increases as more tasks are added, especially when tasks are spread out among multiple people. Furthermore, all tasks of project participants may affect a project, even if the tasks are not directly tied to the project.

BRIEF SUMMARY

From the foregoing discussion, it should be apparent that a need exists for an apparatus, system, and method for dynamic task association. Beneficially, such an apparatus, system, and method would update tasks of a first project based on changes in tasks of a second project independent from the first project.

The present invention has been developed in response to the present state of the art, and in particular, in response to the problems and needs in the art that have not yet been fully solved by currently available project management and calendar systems. Accordingly, the present invention has been developed to provide an apparatus, system, and method for dynamic task association that overcome many or all of the above-discussed shortcomings in the art.

A method for dynamic task association is presented. In one embodiment, the method includes maintaining associations between a plurality of projects. Each project may include a plurality of tasks specific to the project. The method may also include detecting a change in a particular task of a first project that affects one or more tasks of a second project. The first project and the second project may be of the plurality of projects and the second project may be independent from the first project. The method may also include updating one or more tasks of the second project affected by the change in response to detecting the change in the particular task of the first project.

The apparatus for dynamic task association is provided with a plurality of modules configured to functionally execute the steps of maintaining a plurality of projects, detecting a change in a particular task of a first project, and updating one or more tasks of the second project. These modules in the described embodiments include a project module, a detection module, and an update module.

In one embodiment, the project module maintains a plurality of projects. Each project may include a plurality of tasks specific to the project. In one embodiment, the detection module detects a change in a particular task of a first project that affects one or more tasks of a second project. The first project and the second project may be of the plurality of projects and the second project may be independent from the first project. In one embodiment, the update module updates one or more tasks of the second project affected by the change in response to the detection module detecting the change in the particular task of the first project.

A system of the present invention is also presented for dynamic task association. The system may be embodied as a processor and a memory storing modules for execution by the processor. The memory includes, in one embodiment, a project module, a detection module, and an update module.

In one embodiment, the project module maintains a plurality of projects. Each project may include a plurality of tasks specific to the project. In one embodiment, the detection module detects a change in a particular task of a first project that affects one or more tasks of a second project. The first project and the second project may be of the plurality of projects and the second project may be independent from the first project. In one embodiment, the update module updates one or more tasks of the second project affected by the change in response to the detection module detecting the change in the particular task of the first project.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1A:
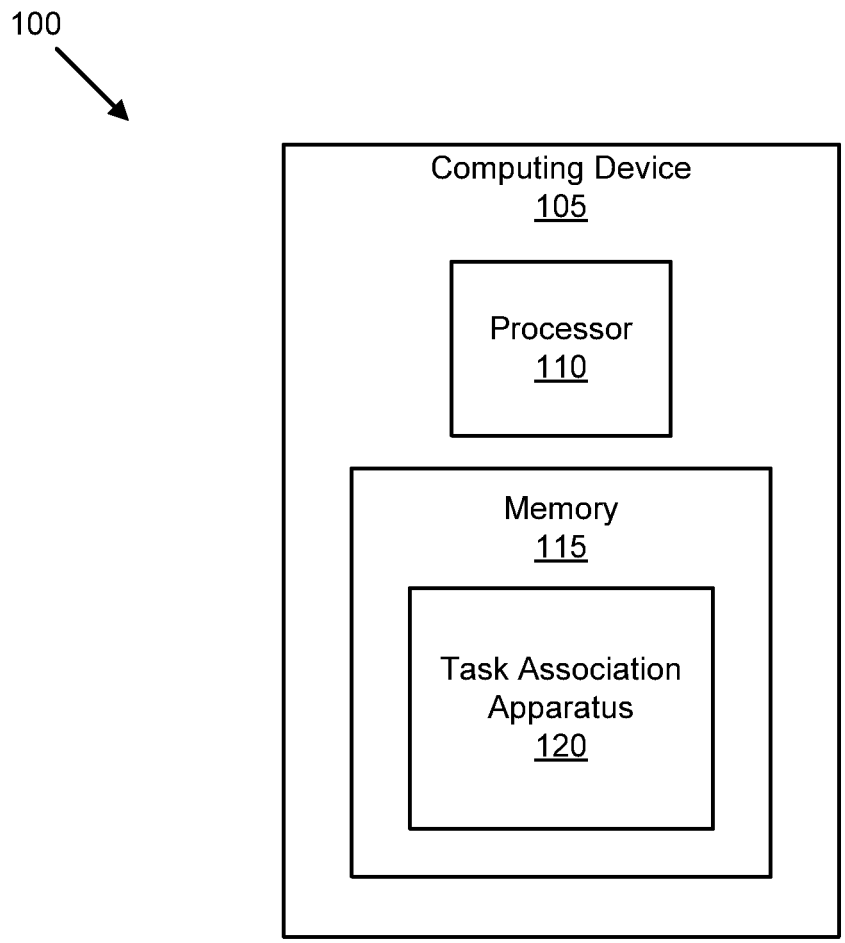
FIG. 1A is a schematic block diagram illustrating one embodiment of a system for dynamic task association in accordance with the present invention.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1A depicts one embodiment of a system 100 for dynamic task association in accordance with the present invention. The system 100 includes a computing device 105 with at least one processor 110 and a memory 115. Furthermore, the memory 115 includes a task association apparatus 120. The computing device 105 may include, but is not limited to, a personal computer, a server, a personal desktop assistant ("PDA"), a tablet computer, a Smartphone, and the like. The memory 115 may store computer readable programs and the processor 110 may execute the computer readable programs as known to those skilled in the art.

As depicted, in one embodiment, all or a portion of the task association apparatus 120 may be stored on the memory 115 and executed by the processor 110. In addition, in some embodiments, all or a portion of the task association apparatus 120 may be implemented as logic hardware. Furthermore, although in the depicted embodiment, the task association apparatus 120 resides in the computing device 105, in other embodiments, all or a portion of the task association apparatus 120 may reside in an external device in communication with the computing device 105, or may reside in a plurality of computing devices 105.

Figure 1B:
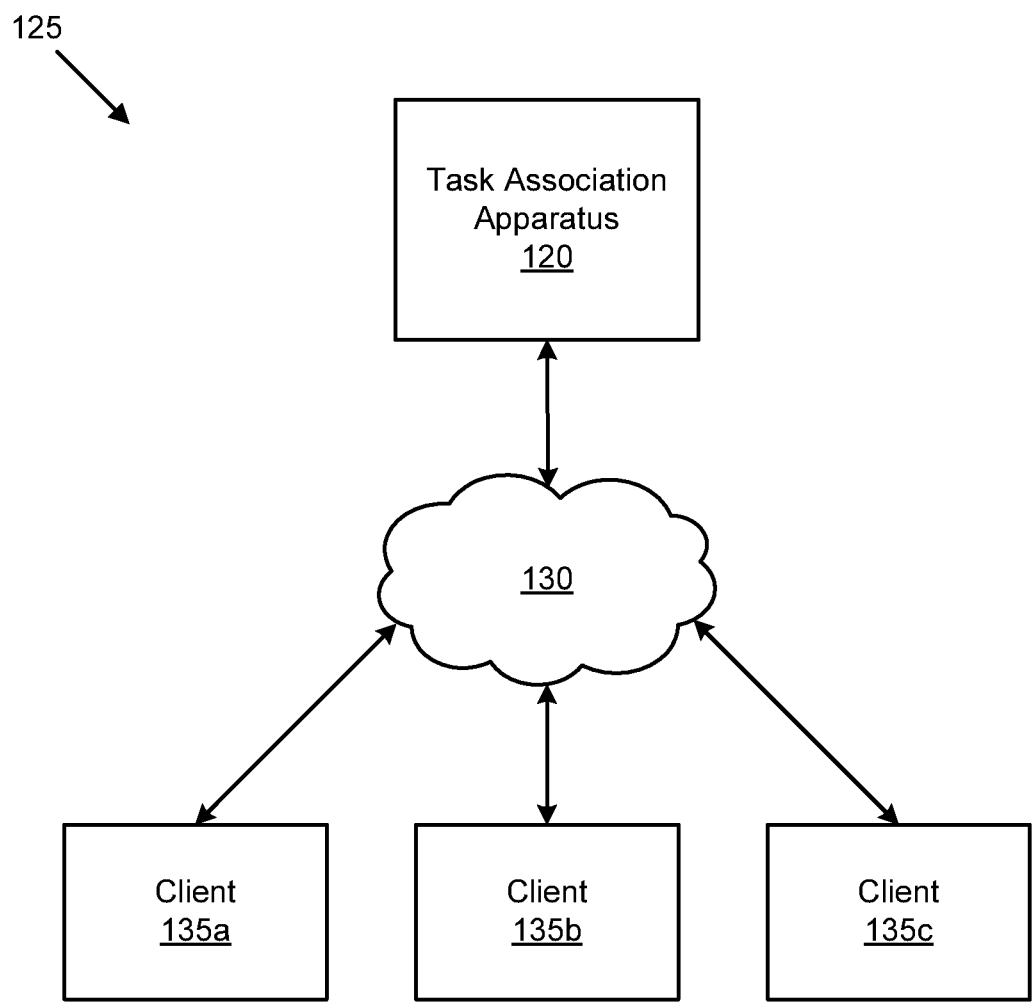
FIG. 1B is a schematic block diagram illustrating one embodiment of a system for dynamic task association in accordance with the present invention.

Referring to also to FIG. 1B, depicting another embodiment of a system 125 for dynamic task association, the system 125 may include the task association apparatus 120 communicating with one or more clients 135a, 135b, 135c through a communication medium 130. All or a portion of the task association apparatus 120 may reside on one or more computing and/or information handling devices such as a personal computer, a server, mainframe, a personal desktop assistant ("PDA"), a tablet computer, a Smartphone, and the like. Furthermore, all or a portion of the task association apparatus 120 may be implemented as logic hardware, software or a combination of logic hardware and software. In one embodiment, the communication medium 130 may comprise a communications network such as the Internet, a Local Area Network ("LAN"), multiple LANs communicating over the internet, or any other similar communications network. In one embodiment, the communication medium 130 comprises a system bus, such as a peripheral component interconnect express ("PCI-e") bus, a Serial Advanced Technology Attachment ("serial ATA") bus, or the like.

A client 135a may communicate with the task association apparatus 120 through the communication medium 130. In one embodiment, the client 135a may be embodied as a desktop computer, a portable computer, a server, a mainframe computer, a handheld computing device, a touch device, a PDA, a table computer, an e-Book reader, a mobile phone, a Smartphone, and the like. In one embodiment, the client 135a may also include and/or is embodied as a software application.

Conventional project management applications focus on tasks directly tied to a particular project. Because unrelated tasks and/or events in a project participant's personal time often delay projects and influence project schedules, conventional project management applications often take manual effort by the participants and project manager to keep updated.

The task association apparatus 120 maintains associations between a plurality of projects and generates scheduling options to optimize a user's calendar and meet task deliverable dates. The task association apparatus 120 may continually define and update time allocations of tasks for both work time and personal time based on task changes, priorities that arise, deliverables that shift, and/or calendar changes. Furthermore, the task association apparatus 120 may detect changes in tasks of a first project that affect tasks in a second project independent from the first project. The task association apparatus 120 may update tasks in the first project and/or the second project to accommodate scheduling conflicts or may present options of scheduling changes to the user participants of the first and second projects.

In one embodiment, the task association apparatus 120 includes project management functionality, calendaring functionality, task application functionality, and/or the like. Therefore, a user may create, edit, and delete projects and tasks, manage a calendar, and the like through the task association apparatus 120.

Figure 2:
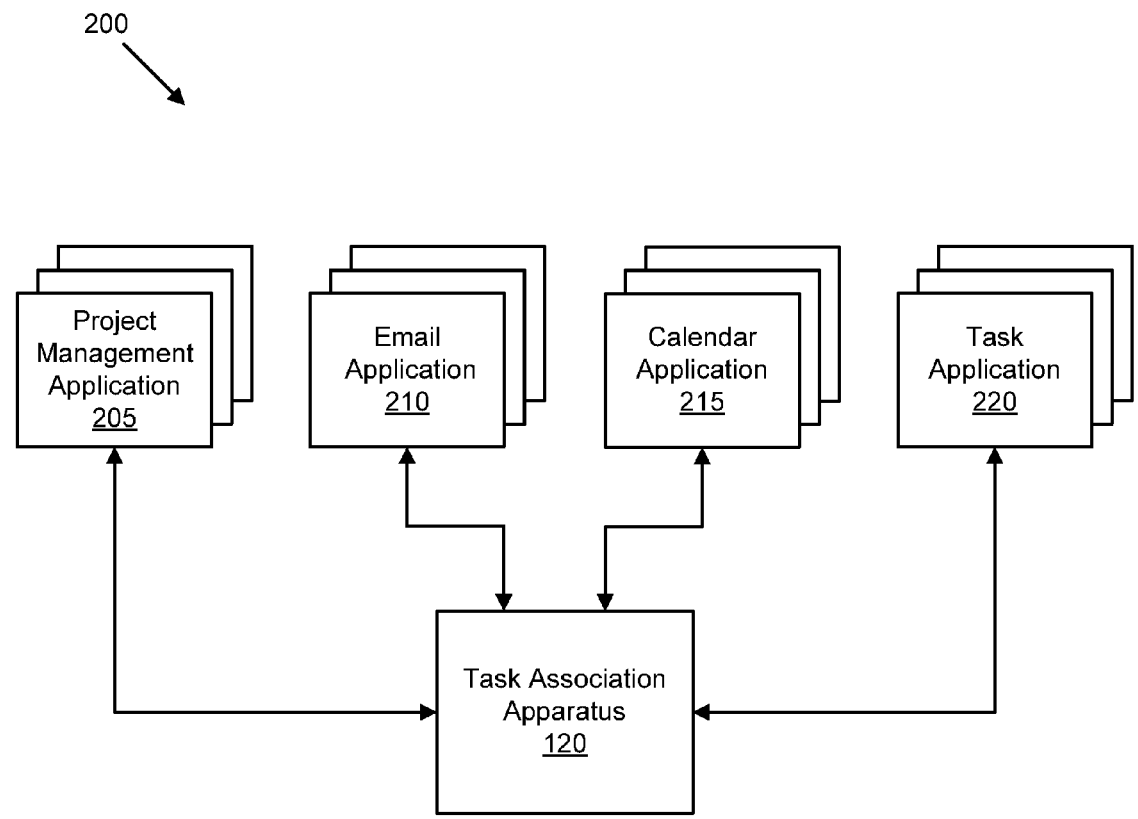
FIG. 2 is a schematic block diagram illustrating another embodiment of a system for dynamic task association in accordance with the present invention.

Referring to FIG. 2 showing another embodiment of a system 200 for dynamic task association, in one embodiment, the task association apparatus 120 may interface with one or more of project management applications 205, email applications 210, calendar applications 215, task applications 220, and the like. A task application 220 may include a "to-do" application providing a simple task lists allowing a user to "check-off" tasks when completed. Furthermore, although FIG. 2 depicts various applications 205, 210, 215, 220 as separate entities, one skilled in the art realizes that a single application may include one or more of project management functionality, email functionality, calendar functionality, and the like.

The task association apparatus 120 may communicate project and/or task information with these applications 205, 210, 215, 220 and coordinate task and scheduling information among each application 205, 210, 215, 220. In one embodiment, the task association apparatus 120 may exchange information and perform functions such as scheduling time in calendars, creating and editing tasks and projects, and the like in these applications 205, 210, 215, 220 by way of an interface such as an Application Programming Interface ("API"). In certain embodiments, the task association apparatus 120 includes its own project management functionality, calendaring functionality, and/or task application functionality and also interfaces with other project management applications 205, email applications 210, calendar applications 215, task applications 220, and the like.

Figure 3:
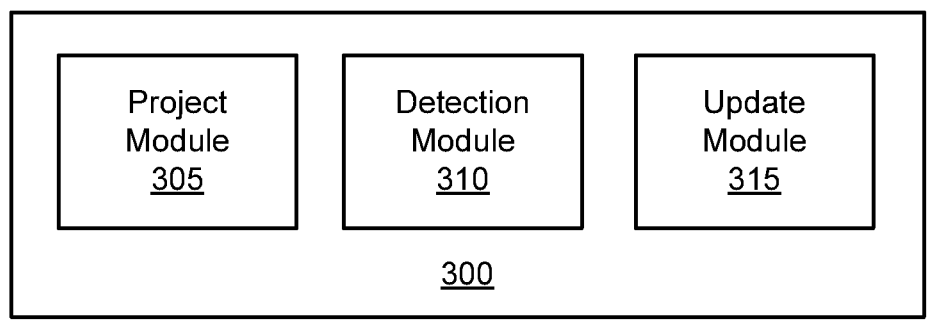
FIG. 3 is a schematic block diagram illustrating one embodiment of an apparatus for dynamic task association in accordance with the present invention.

FIG. 3 depicts one embodiment of an apparatus 300 for dynamic task association in accordance with the present invention. The apparatus 300 may comprise one embodiment of the task association apparatus 120 depicted in FIGS. 1A, 1B and/or FIG. 2. The apparatus 300 includes one or more of a project module 305, a detection module 310, and an update module 315.

The project module 305 maintains associations between a plurality of tasks and projects and/or maintains a plurality of tasks and projects. A task may be an activity that spans a period of time. Examples of tasks may include meetings, drafting, writing reports, lunch, vacation, and the like. A project may be may be a grouping of tasks for completing a deliverable and may include a plurality of tasks specific to the project. Examples of projects may include creating new hardware, new software, updating a manufacturing line, and the like.

In one embodiment, the project module 305 maintains associations between tasks of related and unrelated projects by monitoring scheduling relationships between tasks, hour requirements of tasks, deadlines, and the like. Furthermore, maintaining a project and its associated tasks may include hosting, managing and/or providing a project and tasks for one or more users. For example, the project module 305 may allow a user to create, name, schedule, and set attributes for tasks and/or projects. The project module 305 may manage ongoing projects and tasks, allowing users to mark tasks as completed, change the status of tasks, and the like.

In one embodiment, maintaining a project and its associated tasks may include interfacing with a project and its tasks hosted on an application external to the apparatus 300 such as on a project management application, a task application, and the like.

In one embodiment, the project module 305 classifies each project of the plurality of projects as a work project or a personal project. A personal project may be associated with personal time and/or personal activities of a user and a work project may be associated with work time and/or work activities of the user. In certain embodiments, the project module 305 may classify a project under additional classifications (e.g. church, community, fitness, and the like). In one embodiment, the project module 305 represents each activity (e.g. work activities and personal activities) of a user as a task within a project. In one embodiment, each hour for a user—24 hours a day, 7 days a week, 168 hours a week—is scheduled for a particular task. For example, the hours from 9:00 a.m. to 5:00 p.m. on weekdays may be scheduled under tasks of work projects while other hours are scheduled under tasks of one or more personal projects. In another example, the project module 305 represents each activity during hours that a person is awake.

In one embodiment, each task includes a protocol and a plurality of task attributes. A protocol may be rules related to a particular task. In one embodiment, the protocol of the task is dependent on the owner, the authorization, the parent project, and/or the type of task. An example of a protocol may be rules used to define personal time, such as defining personal time as not interruptible under any circumstances, interruptible for critical path tasks only, interruptible for any task that has a higher priority, and the like. The project module 305 may store the protocol and task attributes in association with a particular task.

Furthermore, least a portion of the task attributes may be set and updated by the protocol and/or manually. The plurality of task attributes may include, but is not limited to, a task type, a time requirement, a project association, participants, authorization, a collaboration requirement, a priority, a work unit selection, an overtime allowance indicator, and/or a status. Table 1 depicts an example embodiment of task attributes and potential values for each attribute:

TABLE 1

| Attribute | Value |
| --- | --- |
| Project association | None |
| | Single Project |
| | Multiple Projects |
| Participants | Individual |
| | Multiple |
| | Group |

TABLE 1-continued

| Attribute | Value |
| --- | --- |
| Type | Meetings |
| | Work |
| | Email |
| | Personal |
| Authorization (controls) | Individual |
| | Delegated |
| | Group |
| Collaboration required | None |
| | Remote |
| | Face-to-Face |
| Priority | 1 - Highest (no other task can bump) |
| | 2 - High |
| | 3 - Medium |
| | 4 - Low |
| Work Units | Complete in continuous block |
| | Break up into equal blocks |
| | Set manually |
| Status | % Complete |

Furthermore, in one embodiment, a project may include a plurality of project attributes. The project attributes may include a description, one or more milestones, a begin date, a completion date, and/or the like. In one embodiment, certain projects may not include attributes. In one embodiment, tasks may inherent attributes from their parent project such as priority.

The detection module 310 detects changes in tasks that may affect other tasks in related and unrelated projects. Specifically, the detection module 310, in one embodiment, detects a change in a particular task of a first project that affects one or more tasks of a second project. The first project and the second project may be of the plurality of projects, maintained by the project module 305, and the second project may be independent from the first project. A first project being independent from a second project, in one embodiment, means that the first project is unrelated to the second project in subject matter and/or in deliverables, are not associated with one another through a particular project management application, reside on different project management applications, lack a direct identified relationship in attributes of the first project and second project, and the like. The detection module 310 may have awareness of related and unrelated tasks that could affect a project for project participants of tasks that are related and unrelated to a project.

In one embodiment, the first project, described above, is a personal project of the user and the second project is a work project of the user. Therefore, the detection module 310 may detect changes in tasks of personal projects affecting tasks of work projects, and vice-versa. In one embodiment, detecting the change in the first task of the first project that affects one or more tasks of the second project further includes detecting a scheduling conflict between the first task of the first project and a second task of the second project. In certain embodiments, changes in tasks that affect other tasks and/or changes that may produce scheduling conflicts may also include priority changes, due date changes, changes in participants, and other task attributes. Scheduling conflicts may include but are not limited to, tasks scheduled at the same time (e.g. meetings), not enough hours to complete two tasks before the deadlines for the two tasks, and the like.

The update module 315 updates one or more tasks of the second project affected by the change in response to the detection module 310 detecting the change in the particular task of the first project. As stated above, in one embodiment, the first project is a personal project of the user and the second project is a work project of the user or vice-versa. Updating one or more tasks of the second project may therefore further include updating one or more tasks of the work project affected by the change in response to detecting the change in the particular task of the personal project.

The update module 315 may update the first task, the second task, and/or one or more additional tasks to accommodate a scheduling conflict. Furthermore, updating a task may include updating one or more attributes of the task and/or updating scheduled time of the task. Furthermore, the update module 315 may automatically update a task and/or may update a task in response to user input and/or presenting possible updates to the user.

In one embodiment, the first task, mentioned above, has a higher priority than the second task and the update module 315 adjusts scheduled time for the second task in response to the detection module 310 detecting the scheduling conflict between the first task and the second task. As stated above, the update module 315 may update a task (including adjusting scheduled time) automatically in certain embodiments. In one embodiment, the first task has a lower priority than the second task. The update module 315 may adjust scheduled time of one or more additional tasks of the second project in response to the detection module 310 detecting the scheduling conflict between the first task and the second task. The one or more additional tasks may be of lower priority than the first task. The update module 315, as stated above, may also present a user with possible updates for the user to select.

Figure 4:
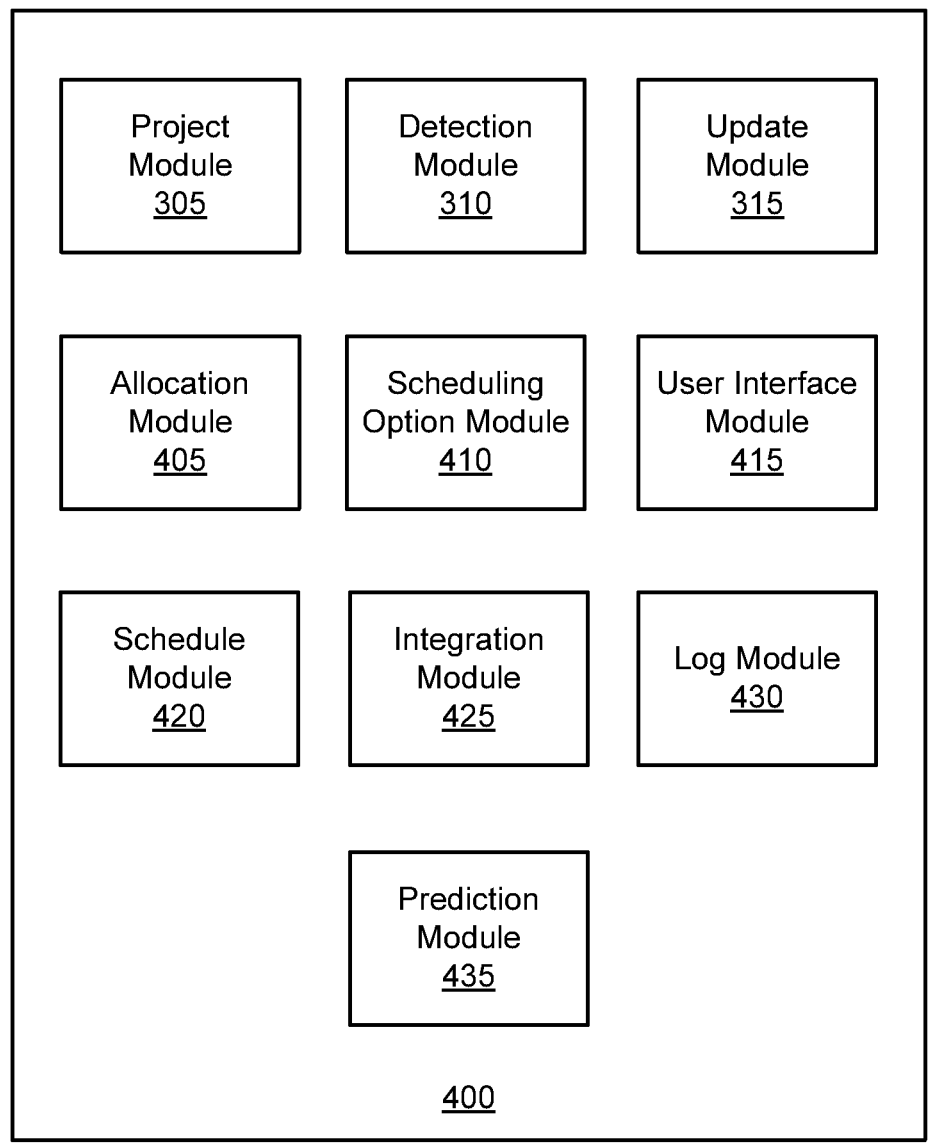
FIG. 4 is a schematic block diagram illustrating another embodiment of an apparatus for dynamic task association in accordance with the present invention.

FIG. 4 depicts another embodiment of an apparatus 400 for dynamic task association in accordance with the present invention. The apparatus 400 may comprise one embodiment of the task association apparatus 120 depicted in FIGS. 1A, 1B and/or FIG. 2. The apparatus 400 includes one or more of the project module 305, the detection module 310, and the update module 315, which may be similar to the like-named modules described in relation to FIG. 3. In addition, FIG. 4 includes one or more of an allocation module 405, a scheduling option module 410, a user interface module 415, a schedule module 420, an integration module 425, a log module 430, and a prediction module 435.

The allocation module 405, in one embodiment, allocates each hour of a 168-hour week (each hour of a user's day, 24 hours a day, 7 days a week), to one or more projects (personal projects and work projects). In another embodiment, the allocation module 405 allocates waking hours of a person during a week and does not allocate sleeping hours. In another embodiment, the allocation module 405 allocates working hours and at least a portion of non-work hours during a week. Furthermore, in one embodiment, the allocation module 405 allocates a percentage of time for the user (the user's availability) for each project assigned to the user. The percentage of time may include a percentage of a 168-hour week. In one embodiment, the allocation module 405 allocates available working time for the user for each project assigned to the user.

In one embodiment, the allocation module 405 maintains user availability, for each user, in a "user window." A user window may be based on 24 hours, 7 days a week, or 168 hours a week as described above. A user's window may vary over time based on a number of available hours to work and a number and type of projects assigned to a user. The allocation module 405 may maintain information for the user's window in one or more data structures, particular to each user. The user window managed by the allocation module 405 may be referenced by the detection module 310, update module 315, scheduling module, and other modules.

As stated above, in one embodiment, each user activity, both work related and personal will be assigned as tasks and under projects. For example, a vacation may be considered a task of the personal project, and if a user sets the vacation task as the highest priority, the allocation module 405 may store this indication in the user's window and other tasks may not interrupt the vacation task. The allocation module 405 may populate the user window for a particular user with projects created by the particular user or from another individual or group. Table 2 depicts an example embodiment of information stored in association with a particular user's user window:

TABLE 2

| Projects | Description | Days | Window | Alt Days | Alt Window | Project allocation time (%) | Overtime Allowed | Priority |
|---|---|---|---|---|---|---|---|---|
| Project A | Prototype | M-F | 8:00-17:00 | Sa | 8:00-11:00 | 2 | Y | 2 |
| Project B | Software | M-F | 8:00-17:00 | Sa | 8:00-11:00 | 5 | Y | 2 |
| Project C | Manual | M-F | 8:00-17:00 | | | 5 | N | 3 |
| Misc | Work | M-F | 8:00-17:00 | | | 12 | N | 4 |
| Personal | Non-work | M-F | 00:00-8:00 | | | 76 | | 2 |
| | | M-F | 17:00-24:00 | | | | | |
| | | Sa, Su | 00:00-24:00 | | | | | |

Based on the embodiment of the user window in Table 2, the particular user has three main projects: Project A, Project B, and Project C. The user is planning on allocating 12% of the user's total weekly hours—168 hrs—to these three projects, which equals approximately 20 hours, leaving 12% or 20 hours for miscellaneous tasks, for a total of 40 hours per week. The rest of the time during the week is devoted to Personal tasks such as, commuting, sleep, and the like, assigned to the Personal Project.

The scheduling option module 410 generates scheduling options. In one embodiment, the scheduling option module 410 generates scheduling options based on user windows for users participating in various tasks. Scheduling options may include suggestions for scheduled time for the first task and the second task described above, and/or one or more additional tasks. In one embodiment, the scheduling option module 410 generates one or more scheduling options based on a first priority for the first task and a second priority for the second task and/or other attributes for each task.

The scheduling option module 410 may generate scheduling options for new tasks—such as when a user first creates a project and assigns tasks. Furthermore, the scheduling option module 410 may work in conjunction with the update module 315 to analyze user windows to determine possible scheduling updates to existing tasks.

User window information such as that in Table 2 may guide the scheduling option module 410 in generating scheduling options, but in one embodiment, the scheduling option module 410 may generate scheduling options outside of designated time in the user window. For example, vacation may be assigned to the Personal project, but the vacation task may be scheduled outside of the standard Personal project window time. The scheduling option module 410 may use attributes of various tasks and user windows for users participating in the various tasks to determine how much time to block out for a given task based on the number of people working on the task, how long the task takes, the milestone that it is assigned to in the project, and the like.

In an example embodiment, Project A in Table 2 is responsible to deliver a prototype on December 15. Two people are assigned the task to complete engineering drawings by August 1. It will take 40 hours to complete the task, but no collaboration is required. They can start the task on July 15, but User B is going on vacation during the last week of July and he has other priorities that do not allow 20 hours of work during the week of July 15. The scheduling option module 410 may generate the following options:

Option 1: User B can complete the task if he works 10 hours of overtime during the week July 15. This option will be selected if the Project authorizes overtime.

Option 2: User B is not authorized to work overtime, so 10 hours of the task is moved over to User A, who has time during the last 2 weeks of July for 30 hours of work.

Option 3: User B is not authorized to work overtime, and the work must be split evenly between the two employees. The application will inform User B that he cannot complete the task on the deadline, and will either have to move the milestone or change task priorities.

The scheduling option module 410 may account for personal and work related tasks for both employees while generating scheduling options. If the both employees have time to complete the tasks by the milestone then time may automatically be scheduled as described below.

In one embodiment, the user interface module 415 may display scheduling options generated by the scheduling option module 410 to a user. The user interface module 415 may display prompts, scheduling options, warnings, and the like, through a user interface as is known in the art. The user interface module 415 may display warning messages to the user regarding scheduling conflicts. In one embodiment, the user interface module 415 may display a warning message to a user in response to detecting a scheduling conflict between the first task and the second task, described above, when the first task (that has changed) has a lower priority than the second task. In one embodiment, the user interface module 415 displays a prompt to a user to approve a task being assigned outside allocated time in the user window.

The schedule module 420 schedules time for tasks of the plurality of projects. Specifically, the schedule module 420 may schedule time for new tasks—such as when a user first creates a project and assigns tasks. Furthermore, the scheduling option module 410 may work in conjunction with the update module 315 to change scheduled time or schedule additional time for tasks. The schedule module 420 may communicate with one or more project management applications, calendaring applications, and/or project management or calendar functionality in the apparatus, to schedule time and update scheduled time on one or more user calendars.

The schedule module 420 may schedule time of the first project and the second project, described above, on a user calendar based on protocols for the tasks, task attributes for the tasks and allocation information for users and tasks as maintained in the user window. The schedule module 420 may schedule time based on the scheduling options generated by the scheduling option module 410. Furthermore, in one embodiment, the schedule module 420 schedules time in external applications through the integration module 425.

The integration module 425 communicates project information and/or task information with one or more project management applications, one or more email applications, one or more task ("to-do") applications, and/or one or more calendar applications for one or more users. As described above in relation to FIG. 2, the task association apparatus 120, through the integration module 425, may communicate project and/or task information with various applications and coordinate task and scheduling information among each application. In one embodiment, the integration module 425 exchanges information by way of an interface such as an API.

The log module 430 monitors and/or logs time and task information for a plurality of users. The log module 430 may monitor how much time users spend on tasks and projects. In one embodiment, electronic work (meetings, emails, To-Do's, and the like) associated with particular tasks is monitored by the log module 430, which tracks an amount of time spent on the electronic work for particular tasks. For example, the time spent composing or reading emails tied to a project may be monitored.

The prediction module 435 identifies one or more tasks similar to a particular task and predicts a time requirement for the particular task based on logged time and task information for the one or more similar tasks. The prediction module 435 may time information on tasks logged by the log module 430 to predict how long future tasks and projects may take.

Figure 5:
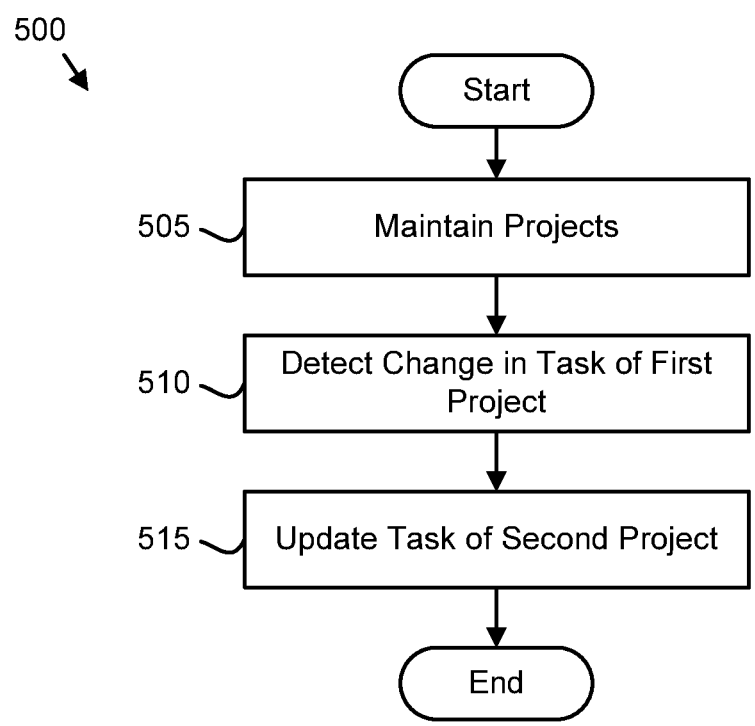
FIG. 5 is a schematic flow chart diagram illustrating one embodiment of a method for dynamic task association in accordance with the present invention.

FIG. 5 depicts one embodiment of a method for dynamic task association in accordance with the present invention. The method 500 substantially includes the steps to carry out at least a portion of the functions presented above with respect to the operation of the described apparatus and systems of FIGS. 1-3. The method 500 begins and the project module 305 maintains 505 a plurality of project. Each project may include a plurality of tasks specific to the project. Next, the detection module 310 detects 510 a change in a particular task of a first project that affects one or more tasks of a second project. The first project and the second project are of the plurality of projects and the second project is independent from the first project. The update module 315 then updates 515 one or more tasks of the second project affected by the change. Then, the method 500 ends.

Figure 6:
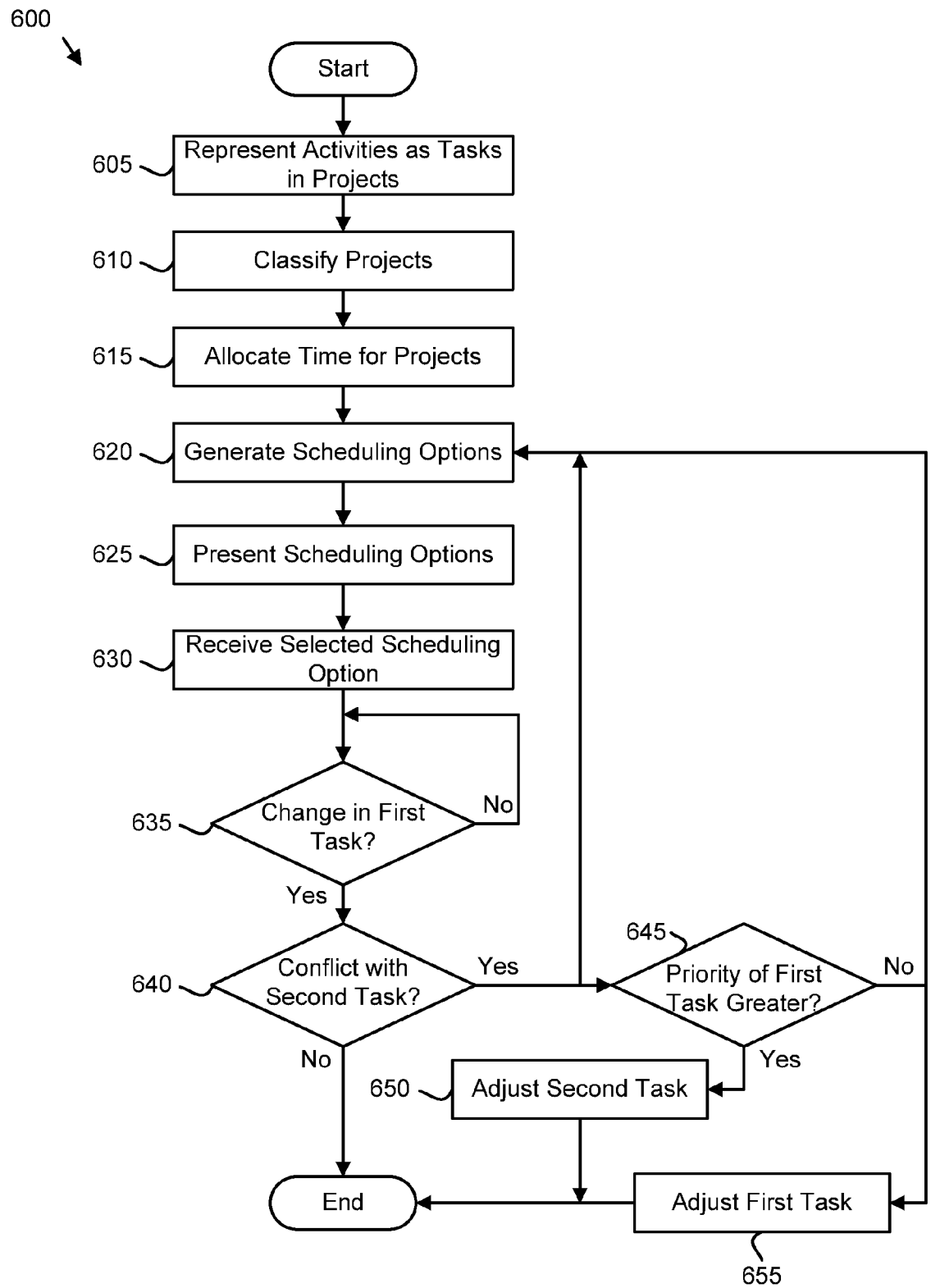
FIG. 6 is a schematic flow chart diagram illustrating another embodiment of a method for dynamic task association in accordance with the present invention.

FIG. 6 depicts another embodiment of a method 600 for dynamic task association in accordance with the present invention. The method 600 substantially includes the steps to carry out at least a portion of the functions presented above with respect to the operation of the described apparatus and systems of FIGS. 1-4. The method 600 begins and the project module 305 represents 605 activities of one or more users as tasks in one or more projects. The project module 305 may also assign attributes to the tasks and/or projects. The project module 305 then classifies 610 each task and/or project as work projects or personal projects. The project module 305 may classify each project according to a user designation. The allocation module 405 then allocates 615 time for projects and creates/updates one or more user windows for users associated with the tasks and projects.

Next, the scheduling option module 410 generates 620 scheduling options using the user windows and task attributes. The user interface module 415 presents 625 the scheduling options to at least one user associated with the projects and tasks. For example, the user interface module 415 may display the scheduling options to a user designated as the project manager for a particular project. The user interface module 415 receives 630 a selected scheduling option from the user. Next, if detection module 310 detects 635 a change in a particular task of a first project the detection module 310 determines 640 if the change affects a second task of a second project. The detection module 310 may reference the user windows of the users involved with the projects and any additional users to determine if the change creates a conflict (e.g. a scheduling conflict) with the second task of the second project. If the detection module 310 determines 640 that the change does not create a conflict with the second task, the method 600 ends.

Alternatively, if the detection module 310 determines 640 that the change creates a conflict with the second task, in one embodiment, the scheduling option module 410 may generate 620 scheduling options to accommodate the change and the method continues to step 625. Or, the update module 315 may determine 645 whether a priority of the first (changed) task is greater than a priority of a second task. If the priority of the first task is greater, the update module 315 adjusts 650 the second task (e.g. signals the schedule module 420 to adjust scheduled time) and the method 600 ends. Alternatively, in one embodiment, if the priority of the second task is greater, the scheduling option module 410 may generate 620 scheduling options to accommodate the change and the method 600 continues to step 625. In one embodiment, the update module 315 adjusts the first task 655 and the method 600 ends. In various embodiments, the update module 315 may also adjust additional tasks depending on task attributes, user windows, and/or user selectable settings.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    maintaining associations between a plurality of projects, each project comprising a plurality of tasks specific to the project, the tasks assigned to two or more users, each project of the plurality of projects classified as one of a work project and a personal project, a personal project associated with one or more of personal time and personal activities of a user and a work project associated with one or more of work time and work activities of the user, the plurality of projects comprising at least one personal project and at least one work project for each user, wherein each task comprises a priority, the priority of a task of a project relative to a priority of a task of another project;
    detecting a change in a particular task of a first project that affects one or more tasks of a second project, the first project and the second project of the plurality of projects, wherein subject matter of the second project is independent from and unrelated to subject matter of the first project; and
    updating one or more tasks of the second project affected by the change in the particular task in response to detecting the change in the particular task of the first project and in response to the priority of the particular task having a priority higher than the one or more tasks of the second project.

2. The method of claim 1, wherein the first project comprises a personal project of the user and the second project comprises a work project of the user, wherein updating one or more tasks of the second project further comprises updating one or more tasks of the work project affected by the change in response to detecting the change in the particular task of the personal project.

3. The method of claim 1, further comprising allocating each hour of a 168-hour week to one or more projects classified as one of a personal project and a work project.

4. The method of claim 3, further comprising allocating a percentage of time for the user for each project assigned to the user, the percentage of time comprising a percentage of a 168-hour week, and further comprising allocating available working time for the user for each project assigned to the user.

5. The method of claim 1, further comprising representing each activity of a user as a task within a project, each activity comprising one of a work activity and a personal activity, each task comprising a priority.

6. The method of claim 1, wherein the changed particular task comprises a first task and wherein detecting the change in the first task of the first project that affects one or more tasks of the second project further comprises detecting a scheduling conflict between the first task of the first project and a second task of the second project.

7. The method of claim 6, wherein the first task has a higher priority than the second task, the method further comprising adjusting scheduled time for the second task in response to detecting the scheduling conflict between the first task and the second task.

8. The method of claim 6, wherein the first task has a lower priority than the second task, the method further comprising generating a warning message to a user in response to detecting the scheduling conflict between the first task and the second task.

9. The method of claim 6, wherein the first task has a lower priority than the second task, the method further comprising adjusting scheduled time of one or more additional tasks of the second project in response to detecting the scheduling conflict between the first task and the second task, the one or more additional tasks of lower priority than the first task.

10. The method of claim 6, further comprising generating one or more scheduling options based on a first priority for the first task and a second priority for the second task, the one or more scheduling options comprising suggestions for scheduled time for one or more of the first task, the second task, and one or more additional tasks.

11. The method of claim 1, wherein each task comprises a protocol and a plurality of task attributes, at least a portion of the task attributes set by the protocol, wherein the plurality of task attributes comprise one or more of a task type, a time requirement, a project association, participants, authorization, a collaboration requirement, a priority, a work unit selection, an overtime allowance indicator, and a status.

12. The method of claim 11, further comprising scheduling time for tasks of the first project and the second project on a user calendar based on one or more of protocols for the tasks and task attributes for the tasks.

13. The method of claim 1, further comprising communicating one or more of project information and task information with one or more of a project management application, an email application, a task application, and a calendar application.

14. The method of claim 1, further comprising:
logging time and task information for a plurality of users; and
identifying one or more tasks similar to a particular task and predicting a time requirement for the particular task based on the logged time and task information for the one or more similar tasks.

15. An apparatus comprising:
a project module for maintaining a plurality of projects, each project comprising a plurality of tasks specific to the project, the tasks assigned to two or more users, each project of the plurality of projects classified as one of a work project and a personal project, a personal project associated with one or more of personal time and personal activities of a user and a work project associated with one or more of work time and work activities of the user, the plurality of projects comprising at least one personal project and at least one work project for each user, wherein each task comprises a priority, the priority of a task of a project relative to a priority of a task of another project;
a detection module for detecting a change in a particular task of a first project that affects one or more tasks of a second project, the first project and the second project of the plurality of projects, wherein subject matter of the second project is independent from and unrelated to subject matter of the first project; and
an update module for updating one or more tasks of the second project affected by the change in the particular task in response to the detection module detecting the change in the particular task of the first project and in response to the priority of the particular task having a priority higher than the one or more tasks of the second project,
wherein the project module, the detection module, and the update module comprise one or more of logic hardware and executable code, the executable code stored on one or more computer readable storage media.

16. The apparatus of claim 15, wherein the first project comprises one of a personal project and a work project of the user and the second project comprises a work project of the user where the first project comprises a personal project and a personal project of the user where the first project comprises a work project and the project module updating one or more tasks of the second project further comprises the project module updating one or more tasks of the second project affected by the change in response to the detection module detecting the change in the particular task of the first project.

17. The apparatus of claim 15, further comprising an allocation module for allocating each hour of a 168-hour week to one or more projects in one of the personal group and the work group and allocating a percentage of time for the user for each project assigned to the user, the percentage of time comprising a percentage of a 168-hour week, the allocation module further allocating available working time for the user for each project assigned to the user.

18. The apparatus of claim 15, further comprising:
a log module for logging time and task information for a plurality of users; and
a prediction module for identifying one or more tasks similar to a particular task and predicting a time requirement for the particular task based on the logged time and task information for the one or more similar tasks.

19. A system comprising:
a processor;
a memory storing modules for execution by the processor, the memory comprising:
a project module for maintaining a plurality of projects, each project comprising a plurality of tasks specific to the project, the tasks assigned to two or more users, each project of the plurality of projects classified as one of a work project and a personal project, a personal project associated with one or more of personal time and personal activities of a user and a work project associated with one or more of work time and work activities of the user, the plurality of projects comprising at least one personal project and at least one work project for each user, wherein each task comprises a priority, the priority of a task of a project relative to a priority of a task of another project;

a detection module for detecting a change in a particular task of a first project that affects one or more tasks of a second project, the first project and the second project of the plurality of projects, wherein subject matter of the second project is independent from and unrelated to subject matter of the first project; and an update module for updating one or more tasks of the second project affected by the change in the particular task in response to the detection module detecting the change in the particular task of the first project and in response to the priority of the particular task having a priority higher than the one or more tasks of the second project.

20. The apparatus of claim 15, further comprising a schedule module that communicates with one or more of a project management application, a calendar application and project management or scheduling functionality of the apparatus to schedule time and update scheduled projects on one or more user calendars of the two or more users and an integration module that communicates one or more of project information and task information with one or more of a project management application, an email application, a task application, and a calendar application of the two or more users.

\* \* \* \* \*